US010150660B2

(12) United States Patent
Koppelaar et al.

(10) Patent No.: US 10,150,660 B2
(45) Date of Patent: Dec. 11, 2018

(54) PARALLEL LIFT TURRET MOUNT

(71) Applicant: Bay-Lynx Manufacturing Inc., Ancaster, Ontario (CA)

(72) Inventors: Greg Koppelaar, Brantford (CA); Kevin Koppelaar, Ancaster (CA); Ron Dorombozi, Cambridge (CA); Gregory D. Gall, Woodstock (CA); John Vanderkolk, Stoney Creek (CA)

(73) Assignee: Bay-Lynx Manufacturing Inc., Ancaster (CA)

( * ) Notice: Subject to any disclaimer, the term of this patent is extended or adjusted under 35 U.S.C. 154(b) by 0 days.

(21) Appl. No.: 15/884,127

(22) Filed: Jan. 30, 2018

(65) Prior Publication Data

US 2018/0215595 A1    Aug. 2, 2018

Related U.S. Application Data

(60) Provisional application No. 62/452,544, filed on Jan. 31, 2017.

(51) Int. Cl.
| | |
|---|---|
| *B66F 7/08* | (2006.01) |
| *B66F 7/28* | (2006.01) |
| *B66F 9/14* | (2006.01) |
| *B66F 9/12* | (2006.01) |
| *B66F 7/06* | (2006.01) |
| *A01C 3/06* | (2006.01) |
| *E01C 19/20* | (2006.01) |

(52) U.S. Cl.
CPC .............. *B66F 7/28* (2013.01); *A01C 3/06* (2013.01); *B66F 7/0616* (2013.01); *B66F 7/08* (2013.01); *B66F 9/125* (2013.01); *B66F 9/145* (2013.01); *E01C 19/20* (2013.01)

(58) Field of Classification Search
CPC .................................. B66F 7/0616; B60P 1/36
USPC ........................................ 414/504, 546, 550
See application file for complete search history.

(56) References Cited

U.S. PATENT DOCUMENTS

| | | | | |
|---|---|---|---|---|
| 2,107,682 | A * | 2/1938 | Wall ................... | B60P 1/38 198/550.4 |
| 2,284,853 | A * | 6/1942 | Wall ................... | B60P 1/36 198/544 |
| 3,414,241 | A * | 12/1968 | De Shano ............ | E01C 19/46 366/1 |
| 6,146,080 | A | 11/2000 | Sinke | |
| 6,164,895 | A * | 12/2000 | Croswell ............. | B60P 1/4485 414/462 |
| 6,464,426 | B1 * | 10/2002 | Girouard .............. | B60P 1/36 404/101 |
| 7,232,285 | B1 * | 6/2007 | Ruch .................. | B60P 1/4421 254/10 R |
| 8,696,296 | B2 * | 4/2014 | Claussen ............. | B65G 41/005 198/317 |
| 9,580,874 | B2 * | 2/2017 | Millsaps, II .......... | B60P 1/36 |
| 2003/0156929 | A1 | 8/2003 | Russell | |

FOREIGN PATENT DOCUMENTS

WO    WO2016015144 A1    2/2016

* cited by examiner

*Primary Examiner* — Jonathan Snelting

(57) ABSTRACT

A parallel lift turret mount for a vehicle. A lift plate and lift mechanism vertically adjust the turret and pivot arm, which can support and guide rotation of, for example, a throw conveyor. The parallel lift turret mount can be used for processing, moving and slinging aggregate and can be coupled with a hopper or vehicle.

25 Claims, 14 Drawing Sheets

PRIOR ART

PARALLEL LIFT TURRET MOUNT

CROSS-REFERENCE TO RELATED APPLICATIONS

This application claims priority to United States provisional patent application Ser. No. U.S. 62/452,544, filed Jan. 31, 2017, incorporated by reference herein in its entirety.

FIELD OF THE INVENTION

The present invention pertains to a parallel mount for use on equipment. In particular, the present parallel lift mount can be used as a height adjustable pivoting platform for use in a spreader turret base.

BACKGROUND

Spreader vehicles convey bulk materials, such as salt, sand, aggregate, soil, mulch, and mixtures thereof, from a storage container to a desired application point. Spreader vehicles generally have two conveyors, the feed conveyor which conveys aggregate from a storage container, and a cross conveyor, also referred to as a throw conveyor, to spread or throw the aggregate to a desired location away from the vehicle. The storage container mounted on the spreader vehicle can be, for example, in the form of a combination dump box or V-Box hopper spreader. A longitudinal feed conveyor positioned below the storage container or hopper and oriented along the axis of the storage container can be used to convey the materials to either the front of the storage container or to the rear of the storage container for discharge. The material can be dumped from the longitudinal feed conveyor onto the ground behind the vehicle, or alternatively onto a cross or throw conveyor which then moves the material away from the storage container and discharges the material at the desired location.

Spreader vehicles generally have a rotationally mounted throw conveyor that can be positioned under the hopper or feed conveyor discharge during operation and stowed during transportation. Hopper trucks such as dump trucks often use hydraulic means to raise and angle the hopper to direct aggregate out of the hopper and onto the throw conveyor. However, a hydraulically raised hopper filled with heavy aggregate significantly raises the centre of mass of the vehicle, leading to instability. Alternatively, other spreader hoppers have an integrated feed conveyor at the bottom of the hopper and an interior hopper angled toward the front of the vehicle to move aggregate material onto the leading edge of the feed conveyor. This configuration of hopper requires the feed conveyor to be directed an upward angle such that the feed conveyor is lower at the front of the truck hopper and higher at the rear of the truck hopper to accommodate the leading edge of the throw conveyor whose height above the ground is fixed to enable stowage of the throw conveyor during transportation. FIG. 1A is a side view of a prior art spreader with a feed conveyor angled up towards the back of the vehicle to align the aggregate dumping baffles to just above the throw conveyor. As shown, the throw conveyor is angled just above grade. FIG. 1B is a close up side view of the fixed throw conveyor mount in a prior art spreader with just above grade throwing angle as shown in FIG. 1A. As shown, the pivot arm which supports the throw conveyor as it moves from a stowed position to a throwing position is vertically fixed to the rear of the vehicle. The fixed vertical position of the pivot arm sets the requirement for the vertical height of the loading end of the throw conveyor to fit under the unloading end of the feed conveyor, which requires the feed conveyor to be either angled upward, lifted upward, or both, to transfer aggregate from the unloading end of the feed conveyor to the loading end of the throw conveyor. Examples of existing equipment such as storage hoppers, throw conveyors, and mobile applications, can be seen through examining Soil King Slingers, Conveyor Application Systems (CAS) Slingers, W. K. Dahms slingers and Bay-Lynx Spreaders. The height limitation on the loading end of the throw conveyor results in an overall rise in centre of gravity of the vehicle to accommodate for alignment of the two conveyors. For heavy vehicles filled with aggregate, the instability caused by raising the centre of mass of the vehicle can result in serious safety concerns at a job site or when driving around corners or curves while loaded.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a parallel lift turret mount as a height adjustable pivoting platform for aggregate handling machinery.

In an aspect there is provided a parallel lift mount for a vehicle comprising: a lift plate; a lift mechanism coupled to the lift plate and the vehicle to vertically adjust the lift plate relative to the vehicle; a pivot arm having a proximal end and a distal end, the proximal end of the pivot arm coupled to the lift plate through a pivot hinge for adjusting angular position of the pivot arm relative to the lift plate; a turret mounted to the distal end of the pivot arm for guiding rotation of a throw conveyor.

In an embodiment of the mount, the lift mechanism comprises a hydraulic lift.

In another embodiment of the mount, the lift mechanism comprises at least two support brackets for securing the mount to the vehicle, each support bracket coupled to at least two pivot hinges.

In another embodiment of the mount, the turret comprises a rotational mechanism. In another embodiment of the mount, the rotational mechanism is a planetary gear.

In another embodiment, the mount further comprises a slope adjustment mechanism for adjusting the slope of the conveyor relative to the ground.

In another embodiment of the mount, the slope adjustment mechanism is hydraulic.

In another embodiment, the mount further comprises a safety hook to secure the lift plate to the vehicle.

In another embodiment of the mount, the proximal end of the pivot arm is mounted off centre of the lift plate.

In another embodiment, the mount further comprises a support plate to couple the lift mechanism to the vehicle.

In another embodiment of the mount, the lift mechanism comprises two support brackets secured to the vehicle, two complimentary support brackets secured to the lift plate, and at least two pivot hinges rotationally connected to the support brackets secured to the vehicle and the complimentary support brackets secured to the lift plate.

In another aspect there is provided a spreader vehicle for distributing aggregate, the vehicle comprising: a hopper comprising a base, frontwall, backwall, and two sidewalls; a feed conveyor at the base of the hopper for conveying aggregate from the front of the hopper to the back of the hopper; a parallel lift mount, the parallel lift mount comprising: a lift plate; a lift mechanism coupled to the lift plate to vertically adjust the lift plate relative to the vehicle such that the lift plate remains substantially parallel to the back of the vehicle; and a pivot arm having a proximal end and a distal end, the proximal end of the pivot arm coupled to the lift plate through a pivot hinge for guiding rotation of the pivot arm relative to the lift plate, the distal end of the pivot arm supporting a turret; a throw conveyor coupled to the turret; and a slope adjustment mechanism for adjusting the slope of the throw conveyor relative to the ground.

In an embodiment of the vehicle, the base of the hopper is substantially horizontal.

In another embodiment of the vehicle, the parallel lift adjustment mechanism is hydraulic.

In another embodiment of the vehicle, the lift mechanism comprises at least two support brackets for securing the mount to the vehicle, each support bracket coupled to at least two pivot hinges.

In another embodiment of the vehicle, the turret comprises a planetary gear. In another embodiment of the vehicle, the planetary gear is powered by a hydraulic motor.

In another embodiment of the vehicle, the proximal end of the pivot arm is mounted off centre of the hopper.

In another embodiment of the vehicle, the slope adjustment mechanism comprises a hydraulic cylinder.

In another embodiment, the vehicle further comprises a pivot arm adjustment mechanism to adjust the angular position of the pivot arm about the pivot hinge. In another embodiment of the vehicle, the pivot arm adjustment mechanism comprises a hydraulic cylinder.

In another embodiment of the vehicle, the slope of the throw conveyor can be adjusted from −25° to 50°.

In another embodiment of the vehicle, the pivot arm angle can be adjusted from 0° to 180°.

In another embodiment of the vehicle, the throw conveyor angle can be adjusted from 0° to 360°.

In another embodiment of the vehicle, the lift mechanism is capable of vertically adjusting the lift plate from 1 to 48 inches.

In another embodiment, the vehicle further comprises a stowing bracket to secure the throw conveyor to the vehicle during transportation.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1A:
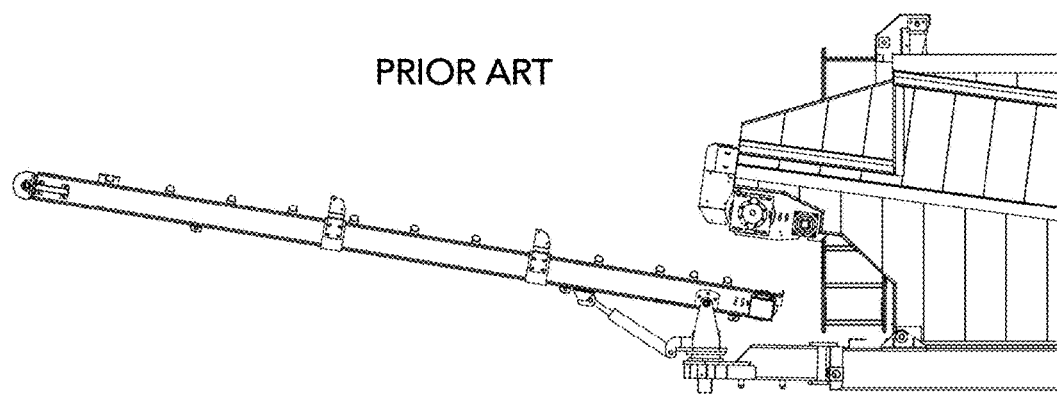
FIG. 1A is a side view of a prior art spreader with the throw conveyor at a throwing angle just above grade.
Figure 1B:
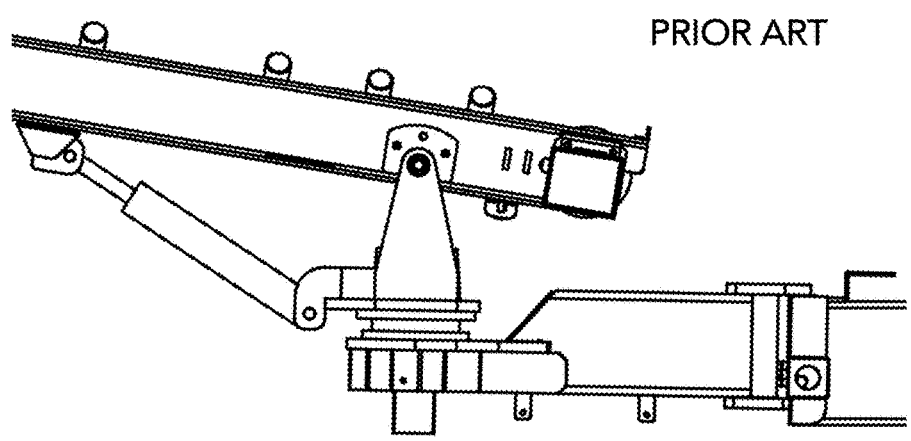
FIG. 1B is a close up view of the fixed throw conveyor mount in a prior art spreader with just above grade throwing angle as shown in FIG. 1A.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "aggregate" as used herein refers to any material that can be used with the present spreader and spreader mount. In construction, common aggregates include but are not limited to stones, sand, soil, salt, gravel, mulch and combinations thereof. It is understood that the presently described spreader and spreader mount can also be used with any bulk material, including grain, fertilizer, ore, bio pellets, pelletized media, crushed media, powders, fines, and manure.

Described herein is a parallel lift turret mount for use on a mobile or stationary application that can be used as a mechanism to adjust the height of one conveyor below or above another. It can also be used as a means of adjusting the height of a pivoting platform for use as a spreader turret base. The parallel lift mount, when used to support a throw conveyor in an aggregate spreader, provides an adjustable mechanism to vertically raise the throw conveyor such that it can be safely stored on the side of the vehicle above the vehicle fenders during transportation and lower the throw conveyor during aggregate throwing (working). Secure stowage of the throw conveyor on the side of the vehicle meets transportation regulations and rotational and vertical lowering adjustment of the throw conveyor during use enables more flexibility of adjustment of the loading end of the throw conveyor, allowing for flatter bottom and lower hopper designs.

The present invention relates to the field of high speed media spreaders with a hopper for the purpose of lowering center of mass and or gravity. These systems can be mounted to heavy vehicles and bodies thereof. Specifically mobile applications (trucks or trailers) with the goal of a lowered, minimal center of mass and or center of gravity, that are designed to throw or spread media (aggregate, stone, sand, gravel, dirt, soil, mulch, etc.) from a high speed conveyor that is fed from a storage hopper via a storage hopper discharge. The high speed conveyor, also known as a throw conveyor, accelerates the media or aggregate rapidly which can result in the media being discharged from the unloading end of the throw conveyor in a projectile manner. The throw conveyor is attached to a throw conveyor turret that is attached to a height adjustable pivoting platform for use as a spreader turret base. The turret acts as a rotational adjustment to adjust the angle of the throw conveyor relative to the vehicle so that aggregate can be thrown in the desired direction without moving the vehicle.

This height adjustable mount platform works to overcome the issues related to feeding the throw conveyor with a flow of media from a flat bottom or near flat bottom (minimal center of mass and or center of gravity) storage hopper without touching the ground. Traditionally, feeding the throw conveyor is accomplished through developing an angled storage hopper that delivers the media to an elevated level or location above the bottom of the storage hopper as shown in FIG. 1A, or through raising one end of the storage hopper to create the vertical separation/alignment of the storage hopper discharge and throw conveyor feed as required. These benchmark system solutions are known to have a high center of mass and or center of gravity which can make them prone to twisted frames or rollover thus compromising operator safety.

A throw conveyor attached to the parallel lift mount mechanism described herein can be utilized while the system is in motion, being driven either manually or remotely, while stationary or fixed mounted. This technology makes it possible to feed a throw conveyor from a flat bottom or near flat bottom (minimal center of mass and or center of gravity) system via a feed conveyor that is capable of throwing while both conveyors are in motion. Therefore, this new type of height adjustable pivoting platform for use as a spreader turret base can be used in the field to change the height of the throw conveyor thus facilitating storage hopper design with a lower center of mass and or center of gravity. Such a reduction can reduce the probability of the storage hopper and entire assembly from rolling over and/or damaging the frame. This can also allow vehicle deployment on steeper grades enabling improved capabilities to this technology field as a whole. The hopper can be a dump style, tilt style or permanently fixed style having an endless feed conveyor structurally integrated into the bottom of the storage hopper body.

The invention consists of a height adjustable pivoting platform and throw conveyor turret that is capable of both facilitating up and down, left, right motion coupled with the ability to rotate and stow a throw conveyor when not in use. The invention is made from metal and is capable of supporting large torque loads resulting from the extension of the throw conveyor. A throw conveyor used in spreader vehicles is at times 18+ feet long and can weigh over 1,000 pounds. The invention can be powered by hydraulic, pneumatic or other electro-mechanical means. The operator (a person or robot) of the system, can be granted control of the parallel lift mount height adjustable pivoting platform and the attached throw conveyor turret for use as a tool when positioning the throw conveyor as desired. The combination of pivot arm, turret and parallel lift mechanism for the throw conveyor allows a broad range of motion for the throw conveyor up, down, left, and right relative to the vehicle, vehicle or platform to which it is mounted.

The height adjustable pivoting platform consists of a main support or lift plate that facilitates vertical movement in such a way that the throw conveyor and throw conveyor turret can be parallel to the ground when in the throwing position. The height adjustable pivoting platform or lift plate facilitates the motion of the throw conveyor from the stowed position on the side of the storage hopper to the throw position on the back of the storage hopper. Typically, the throw position is in line with the storage hopper center line while the stow position is off center. This pivoting action can be accomplished through the use of a pivoting arm or arms supported on the center line or off the center line of the storage hopper or a sliding mechanism or a rotating mechanism. Each of these mechanisms can be powered through the use of hydraulic, pneumatic or other electro-mechanical means.

The presently described parallel lift mount will allow the throw conveyor to be moved from its stowed position to an intermediate height (between high and low) and manipulated (rotated, operated) for the purposes of maneuvering a mobile application into a limited space jobsite while maintaining maximum ground clearance. This operation at an intermediate height will allow the system to incrementally or fully change configuration from stowed to working and or working to stowed.

Some advantages of the described parallel lift mount to a vehicle to which it is mounted include features such as enabling a hopper with a level bottom, lowered center of mass/gravity, and allowing positioning of a throw conveyor turret that moves in x,y axis. In addition, the functionality of the storage hopper and throw conveyor can remain largely unchanged, which enables existing vehicles to be retrofitted with the present parallel lift mount while still taking advantage of its features. In addition, the described parallel lift mount enables a new, previously unavailable, degree of freedom to the design considerations for the development of a stone spreader/slinger vehicle, in particular a methodology and supporting mechanisms to facilitate a flat bottom or near flat bottom (minimal center of mass and or center of gravity) storage hopper that can be used to feed a throw conveyor.

Figure 2:
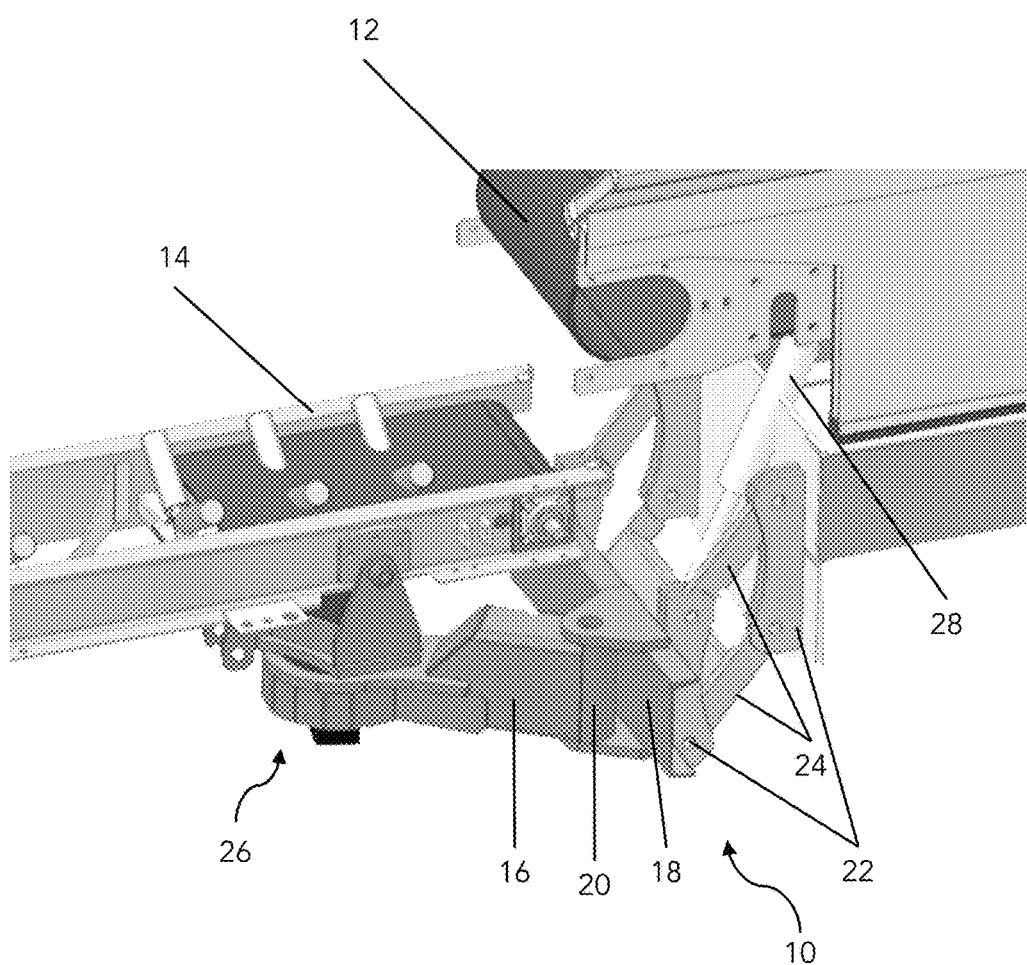
FIG. 2 is a perspective view of the parallel lift mechanism in the low or working position.

Turning to the figures, FIG. 2 is a perspective view of the parallel lift mechanism in the low or working position. A parallel lift mechanism device 10 is shown for a spreader vehicle having a feed conveyor 12 and a throw conveyor 14. Throw conveyor 14 is shown with angled guide bars to guide the conveyor belt in a v-shaped configuration. The throw conveyor is shown in the drawings both with and without the belt, though it would be understood to the skilled person that a moving belt of suitable material would be required to convey the aggregate on the conveyor. The conveyors may be constructed using belting or chains, cleated or smooth, powered from the head or tail, be covered or uncovered, and optionally work in conjunction with other conveyors to compress/retain the aggregate material. The parallel lift device 10 is shown in the low or working position with the unloading end of the feed conveyor 12 positioned above the loading end of the throw conveyor 14 to receive aggregate. The pivot arm 16 can be positioned off-centre of the centre line (front to back) of the chassis (vehicle, trailer, stationary mount) that is different than that of the storage hopper. Off-centre positioning of pivot arm 16 allows the pivot arm to be shorter while providing a turning axis for positioning the throw conveyor 14. The parallel lift mechanism 10 provides a vertical height adjustable pivoting platform or lift plate 18 which, in combination with an off center pivot arm 16 member, is capable of moving to simultaneously facilitate vertical and horizontal movement components. The support structure drops or rotates the vertical lift plate 18 platform into place while held in place and supported by pivot hinge 20. Rotational pivot arm 16 rotates about the center line of the pivot hinge 20 to accomplish the horizontal motion through following the curvature of the circular motion.

A variety of parallel lift mechanisms can be used to orient the lift plate 18 either to lift the platform away from the storage hopper (parallel to the center line) or to move the platform horizontally (perpendicular to the storage hopper). The perpendicular motion can also be manipulated to simultaneously accomplish some or all of the vertical and horizontal motion components that are required. In the example shown, support brackets 22 are anchored to the rear of the vehicle and have corresponding support brackets 22 anchored to the lift plate 18. The support brackets 22 on the vehicle and the lift plate are attached together by angled support bars 24 which provide structural support for the vertical movement of lift plate 18 while retaining the lift plate 18 parallel to the rear of the vehicle. Lift mechanism 28 attached to lift plate 18 adjusts the vertical height of the lift plate 18 while the support brackets 22 and support bars 24 control the position of the lift plate 18. Other structural configurations can also be used to orient and support the lift plate in a vertical position and several possible solutions to achieve these goals can be used through the use of a height adjustable pivoting platform. Slider or shuttle technology can also be used to facilitate horizontal and vertical motion. In one example, an incline shuttle can facilitate both vertical and horizontal motion simultaneously.

The throw conveyor 14 needs to be positioned under the storage hopper discharge (vertical and horizontal motion) to receive aggregate. The pivot arm 16 supports a turret 26, which provides supported rotational freedom to the throw conveyor 14 so that it can be positioned at the desired angle relative to the centre line (front to back line) storage bin for delivery of aggregate. All of the components of the parallel lift mount need to be rigid in design and work together as a system to facilitate the transportation (motion) of a throw conveyor from the stowed position (typically along the side of the storage hopper off center) to the working position (on the storage hopper centerline below the storage hopper discharge). Horizontal movement is achieved through employing the off center and shortened swing frame pivot arm 16 and throw conveyor turret 26 powered by hydraulic cylinders and motors that are controlled by the operator. All pivot points can further consist of a bushing welded in place to receive a pin. The throw conveyor turret 26 is mounted to the extreme or distal end of the pivot arm. The device can be subject to a large torque moment and thus needs to be capable of accommodating the related loads. For this purpose, the components are made to be strong and rigid. The rotational joints are made with bushings and pins to facilitate accuracy and simplicity. The entire mechanism can be rigidly mounted to an existing vehicle or trailer frame when deployed in a mobile application.

Figure 3:
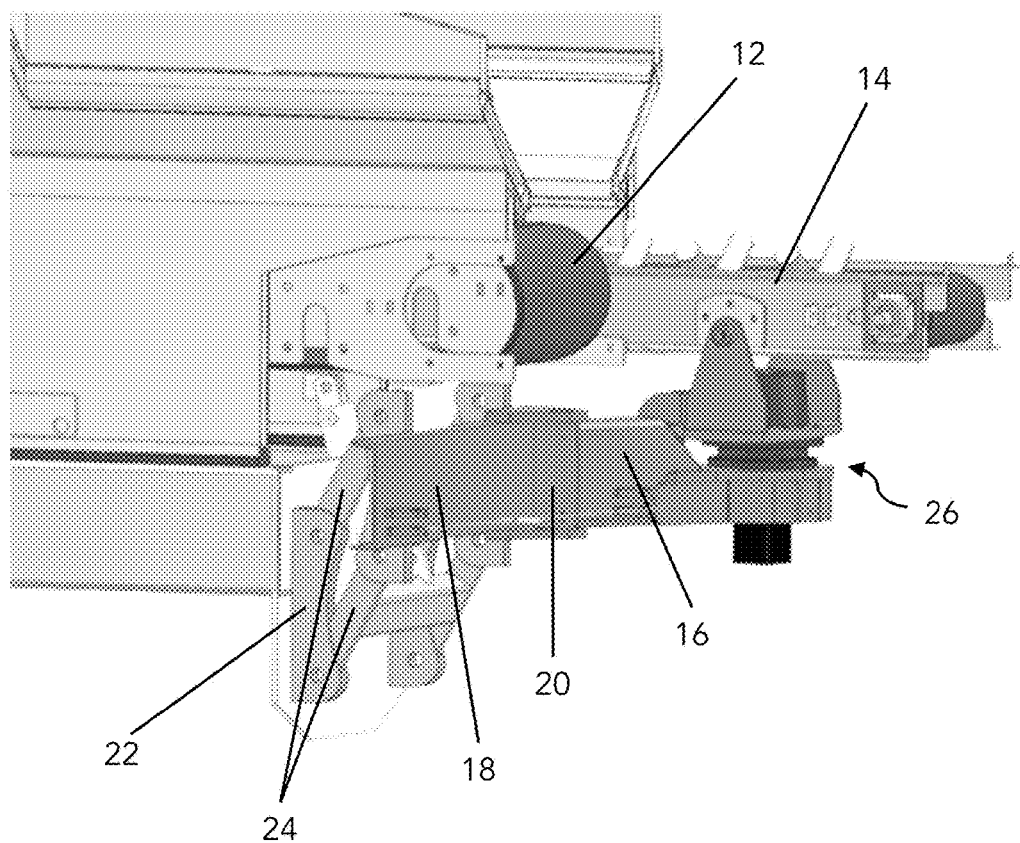
FIG. 3 is a perspective view of the parallel lift mechanism in the raised (stow) position and the throw conveyor rotated into the stow position.

FIG. 3 is a perspective view of the parallel lift mechanism in the raised (stow) position and the throw conveyor 14 rotated into the stow position. The raised or stow position of the throw conveyor 14 is rotated into the stow position adjacent the right side of the vehicle (passenger side in North America). FIG. 3 also shows one possible solution or location to mount the height adjustable pivoting platform mechanism to an existing vehicle or trailer body, here shown on the chassis rails. The described parallel lift mount can be secured to any location on the rear of the vehicle which provides a strong location for supporting the mass of the throw conveyor 14. As shown, support brackets 22 on both the vehicle mount and lift plate 18 are attached together by angled support bars 24 to provide a parallel guide to direct the vertical motion of the lift plate 18 relative to the vehicle. The turret 26 shown is comprised of a turret ring mounted on a platform to pivot arm 16. The pivot arm is pivotally attached to lift plate 18 through pivot hinge 20 to allow pivot arm 16 to have an angular adjustment relative to the lift plate. This angular adjustment can be accomplished with a hydraulic cylinder. In addition, pivot arm 16 can be adjusted to a desired height using the present adjustable parallel lift mechanism. The parallel lift mechanism extends out from the back of the storage hopper (parallel to the center line of the storage hopper) to accomplish some or all of the vertical movement component as required. The pivot arm 16 shown is capable of rigidly pivoting up to 360 degrees for use in moving the throw conveyor turret platform from the stowed position (FIG. 3) to the working or throwing position (FIG. 2) that is normally on the centerline of the storage hopper. Turret 26 comprises a turret ring, which supports a rotational mechanism, such as a planetary gearbox, which actuates a yoke which supports throw conveyor 14 through a pivot point. The yoke is used to support the throw conveyor and the turret base is attached to the pivot arm. The turret can also have a motor, such as a hydraulic motor, to actuate the rotation of the rotational mechanism. This throw conveyor turret platform can accomplish these goals while being mounted centrally or off the centerline of the storage hopper. When in the stow position as shown, the parallel lift plate 18 is in its top or raised position, and the pivot arm 16 is in its full right position. The throw conveyor 14 rests in a stowage nest to secure it during transportation. A rotation adjustment mechanism coupled to the pivot arm allows for and controls the movement of the pivot arm from the side for stowage to the center for working.

Figure 4A:
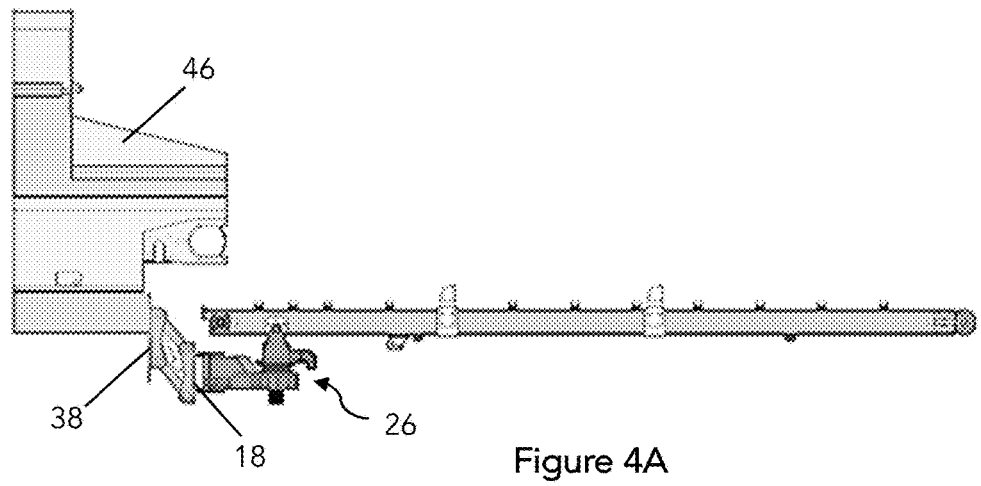
FIG. 4A is a perspective view of the parallel lift mechanism in the low position and the throw conveyor in the low working position.

FIG. 4A is a perspective view of the parallel lift mechanism in the low position and the throw conveyor in the low working position under the storage hopper feed conveyor belt scraper 46. Throw conveyor turret 26 supporting the throw conveyor can have a rotational mechanism or gear for adjusting the angle of the throw conveyor relative to the hopper centreline. The rotational mechanism in the turret can be, for example, a planetary gear, worm gear, helical actuator, hydraulic actuator, or any other rotary device or mechanism capable of rotating the turret. The turret is capable of supporting the torsional loads resulting from supporting the throw conveyor. Additional optional tortional support may also be provided by one or more support bars. Lift plate 18 can have a corresponding parallel support plate 38 which can be secured to the rear of a hopper or vehicle.

Figure 4B:
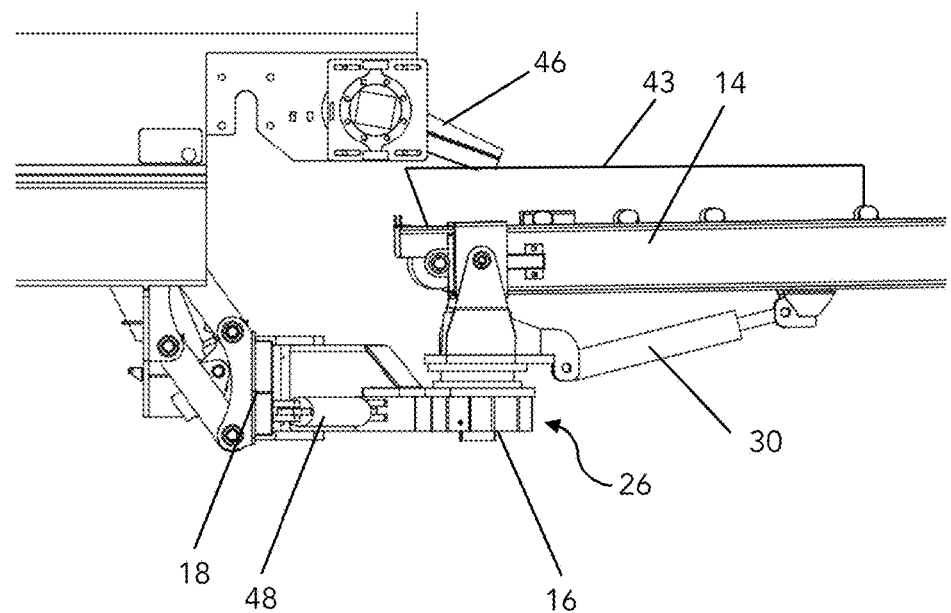
FIG. 4B is a side view of the parallel lift mechanism in the low position and the throw conveyor in the low working position aligned with the unloading end of a feed conveyor.

FIG. 4B is a side view of the parallel lift mechanism in the low position and the throw conveyor 14 in the low working position aligned with the unloading end of a feed conveyor 12 under a belt scraper 46. When in the throw position, the parallel lift 18 is in its bottom or low position, and the pivot arm 16 is in its full left position. The angle of the pivot arm relative to the lift plate can be infinitely and dynamically adjusted with a pivot arm angle adjustment mechanism 48, here shown as a hydraulic cylinder but could also be a pneumatic or electromechanical device. The hydraulic cylinder powering the pivot arm is shown in a retracted position. The parallel lift frame nests into support boss supports to further increase rigidity when in the throw position. The forces and torque loading on the mechanism are greatest when throwing is underway. The height adjustable pivoting platform facilitates the vertical movement of an attached throw conveyor 14, throw conveyor turret 26 and pivot arm 16. The throw conveyor turret 26 facilitates up and down motion of the throw conveyor coupled with the ability to rotate for working and stowed positions. The turret also facilitates angled or slope height adjustments of the throw conveyor 14 for bridging the gap between the unloading or discharging end of the material storage hopper and the throw conveyor infeed hopper 43 through slope adjustment mechanism 30. Slope adjustment mechanism 30 is shown as a hydraulic cylinder but could also be a pneumatic or electromechanical device. As shown, slope adjustment mechanism 30 is functionally attached from the yoke on the turret 26 to a bracket on the throw conveyor 14. The material storage hopper shown is flat bottomed however can also be angled, such as up to 45 degrees to direct aggregate flow inside the hopper. The throw conveyor 14 has an infeed or loading end and a discharge or unloading end. The throw conveyor turret 26 also facilitates secure attachment of the throw conveyor to the pivot arm. The height adjustable pivoting platform facilitates vertical travel and the supporting of the pivot arm. The pivot arm facilitates horizontal motion of the turret, preferably via hydraulics. The pivot arm supporting the throw conveyor turret is preferably supported off of the storage hopper centerline. The throw conveyor turret is also capable of being locked in an elevated safe position for stowage with a latch and aperture in the support plate. In a lowered working position the lift plate can rest on a support boss coupled or adjacent to the support plate to reinforce and stabilize the parallel mount for added strength when working. The support boss provides a captive stabilization to the lowered lift plate to restrict movement. This feature is also shown as support boss 40 in FIG. 7A.

The combination of one or more of these features are capable of transmitting torque and other loads to a suitable location. It is notable that the present mechanism can provide a system whereby vertical and horizontal motion of the system can occur simultaneously. The throw conveyor turret can further provide hydraulic power to the throw conveyor via flex hoses. All the aforementioned functionalities can all be optionally incrementally controlled remotely or directly while the entire system is stationary or in motion.

Figure 5:
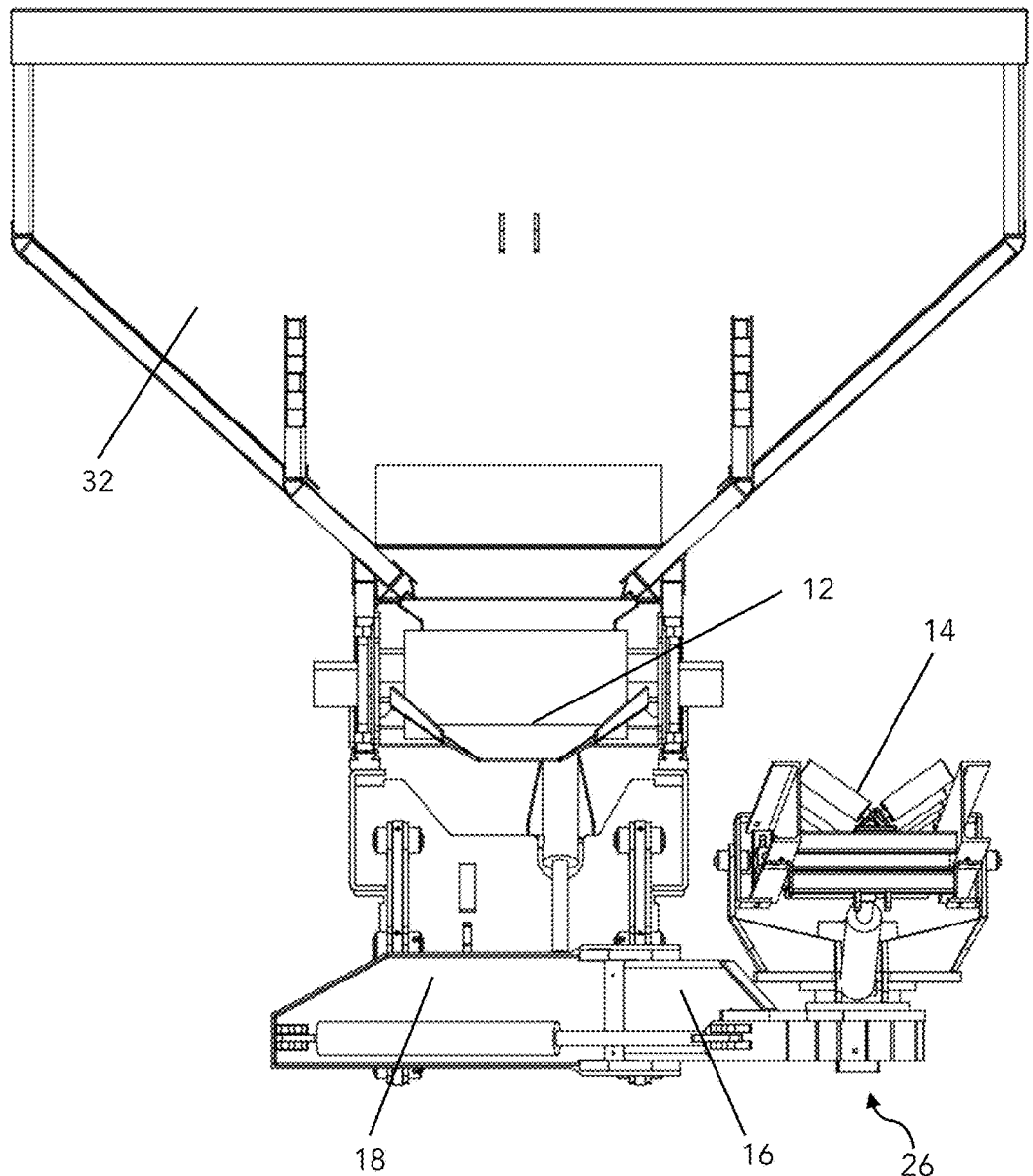
FIG. 5 is a front view the parallel lift mount mounted on the rear of a spreader.

FIG. 5 is a front view the parallel lift mount mounted on the rear of a spreader in a stow position with a hydraulic cylinder powering the pivot arm is in its fully extended position. A spreader unit or vehicle consists generally of a throw conveyor 14, a storage hopper 32 to store the media or aggregate to be thrown, and a pivoting throw conveyor turret 26 on a pivot arm 16 with support frame or lift plate 18 that enables the throw conveyor to move in and out of position for the purpose of stowing when not in use or during transportation in some applications. The storage hoppers are typically of metal (steel and or aluminum) construction and are elevated at one end so that the throw conveyer need only move in a single axis while it travels from stowed position to the working or throw position. A feed conveyor 12 on the bottom of the storage hopper 32 is used to draw media from the storage hopper 32 and deposit it on the throw conveyor 14 feed hopper on demand. There can be a load suspension beam inside the storage hopper to shield the feed conveyor from the excessive weight of the media in the storage hopper. The moving parts are typically powered by hydraulics controlled by an operator either directly or remotely. The components facilitate the rigid motion of a throw conveyor from an elevated or stowed position as shown in FIG. 3 to a lowered position as shown in FIG. 5. FIG. 5 shows the lift plate 18 in the low position, the pivot arm 16 in the full right position and the turret 26 rotated 180 degrees from the stowed position ready to be moved into the working position. This motion consists of a vertical lift component, a horizontal movement component and a rotational movement component. The vertical lift component is defined as the distance in which the mechanism can move vertically, which is the stow height to the lowest throw height. The horizontal movement component is the distance in which the mechanism can move perpendicular to the vertical motion, such as from the stow position to the lowest throw position. The rotational movement component is the ability of the throw conveyor 14 to rotate about the turret for more precise targeting during unloading.

Figure 6:
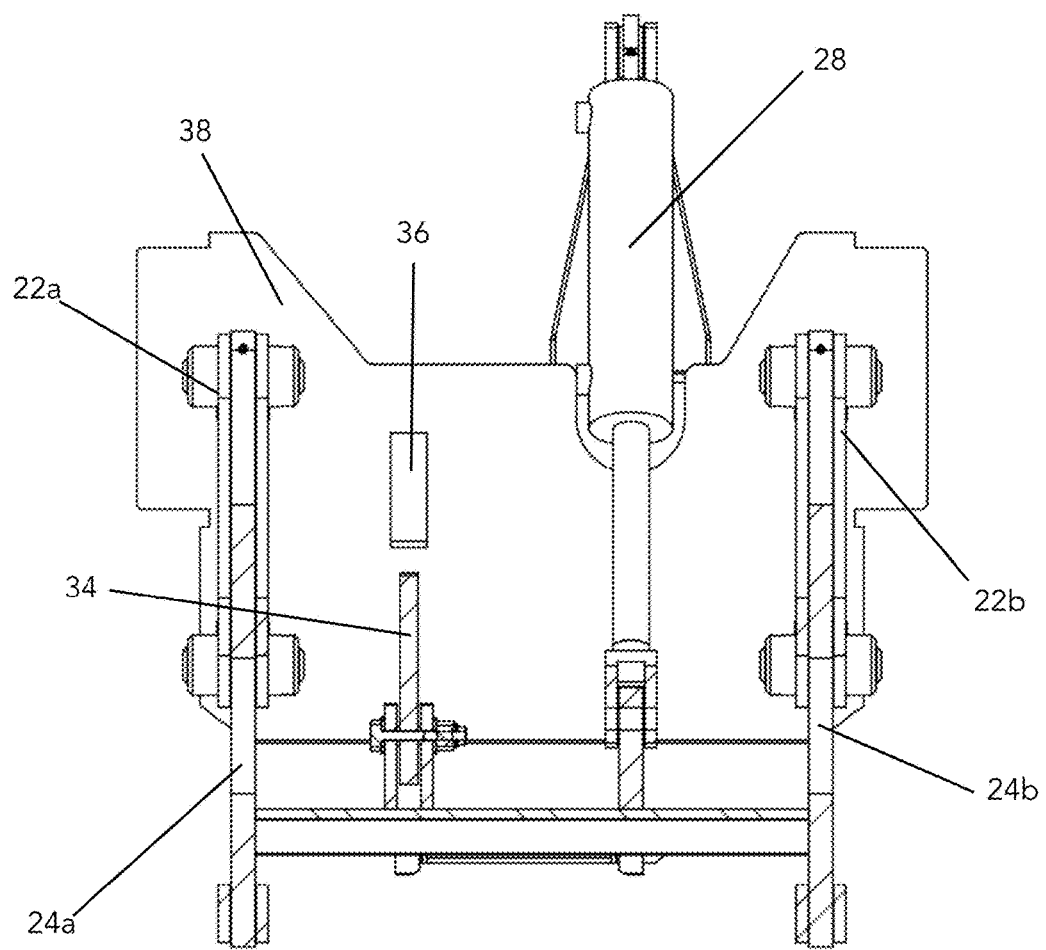
FIG. 6 is a cutaway front view of the parallel lift mount in the lowered working position detailing the safety latch to prevent unwanted lowering.

FIG. 6 is a cutaway front view of the parallel lift mount in the lowered working position, shown without the lift plate. FIG. 6 also shows the safety hook 34 to prevent unwanted lowering of the lift plate. Support plate 38 affixed to the rear of a vehicle supports support brackets 22a, 22b which provide vertical angular control to the positioning of the lift plate coupled with angled support bars 24a, 24b pivotally secured to support brackets 22a, 22b respectively. Hydraulic lift mechanism 28 controls the vertical height of the lift plate as well as the distance of the support plate 38 to the lift plate. Safety hook 34 is also provided which is configured to be positioned inside safety hook aperture 36 when the lift plate is in its raised or stowing position.

Figure 7A:
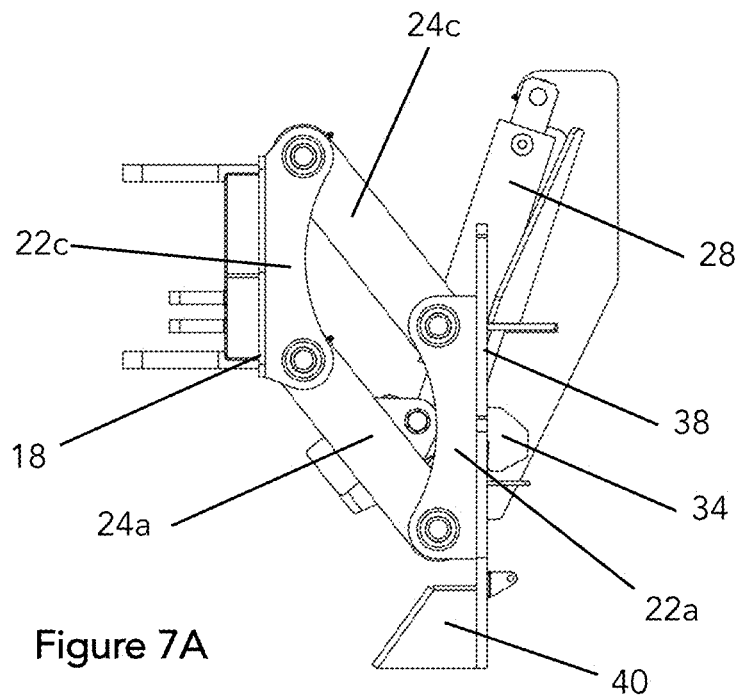
FIG. 7A is a side view of the parallel lift mount in its raised or stow position.
Figure 7B:
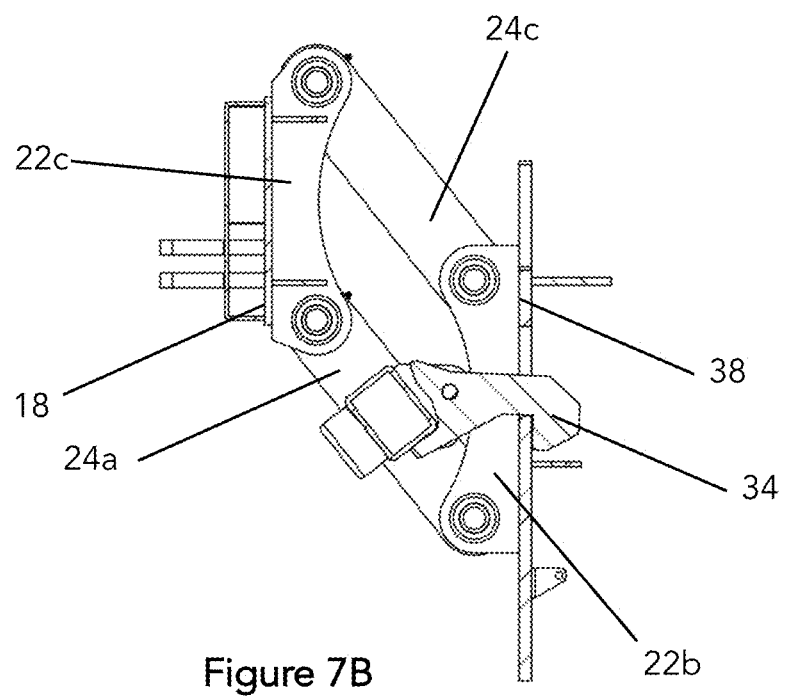
FIG. 7B is a side cutaway view of the parallel lift mount in its raised or stow position detailing the safety latch to prevent unwanted lowering.

FIGS. 7A and 7B are side views of the parallel lift mount in its raised or stow position. Support brackets 22a, 22c on the support plate 38 and lift plate 18, respectively, coupled with angled support bars 24a, 24c, pivotally secure the support plate 38 and lift plate 18 to provide parallel movement and vertical angular positioning control of the lift plate 18 relative to the support plate 38 via hydraulic lift mechanism 28. FIG. 7B is a side cutaway view of the parallel lift mount also showing safety hook 34 in its stowing position detailing the safety latch to prevent unwanted lowering.

Figure 8:
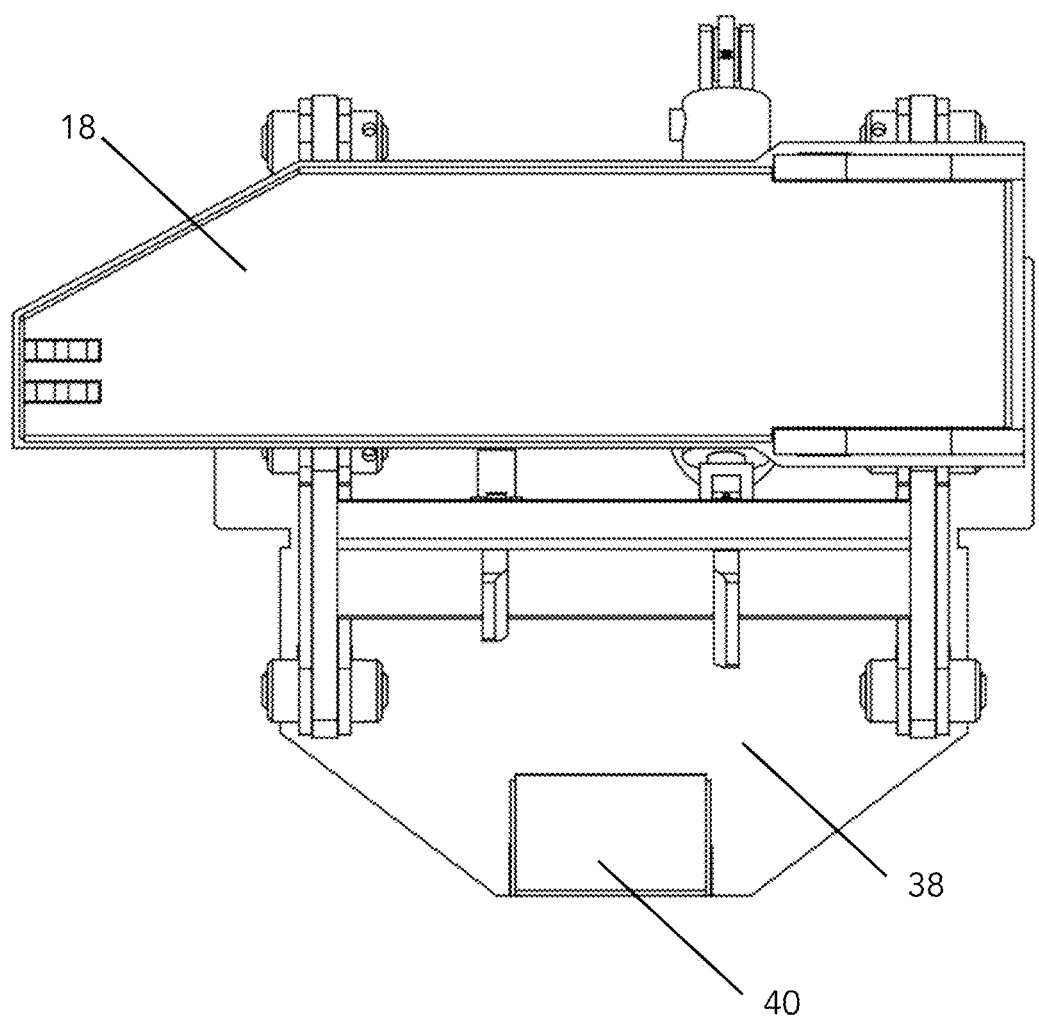
FIG. 8 is a front view of the parallel lift mount.

FIG. 8 is a front view of the parallel lift mount. Lift plate 18 is shown in its raised or stowed position. Support boss 40 supports mounting of the parallel lift mount to the back of a vehicle through support plate 38. This can provide additional stability and strengthen attachment of the parallel lift mount to the vehicle especially when working. The boss can be designed such that the geometries lock the lift plate 18 against the support plate 38 for greatly increased rigidity when in the low/working position. The geometries of the support boss 40 can also be used to align the parallel lift mechanism evenly to prevent the support arm bushings from becoming worn and or damaged. The support boss 40 can also be used to support the full weight of the lift plate and all downstream components to minimize wear type damage resulting from vibrations and/or motions as a result of throwing material. The support boss 40 can be a pin, angled plate, wedge, taper, or any other geometric shape suitable for supporting stable mounting.

Figure 9:
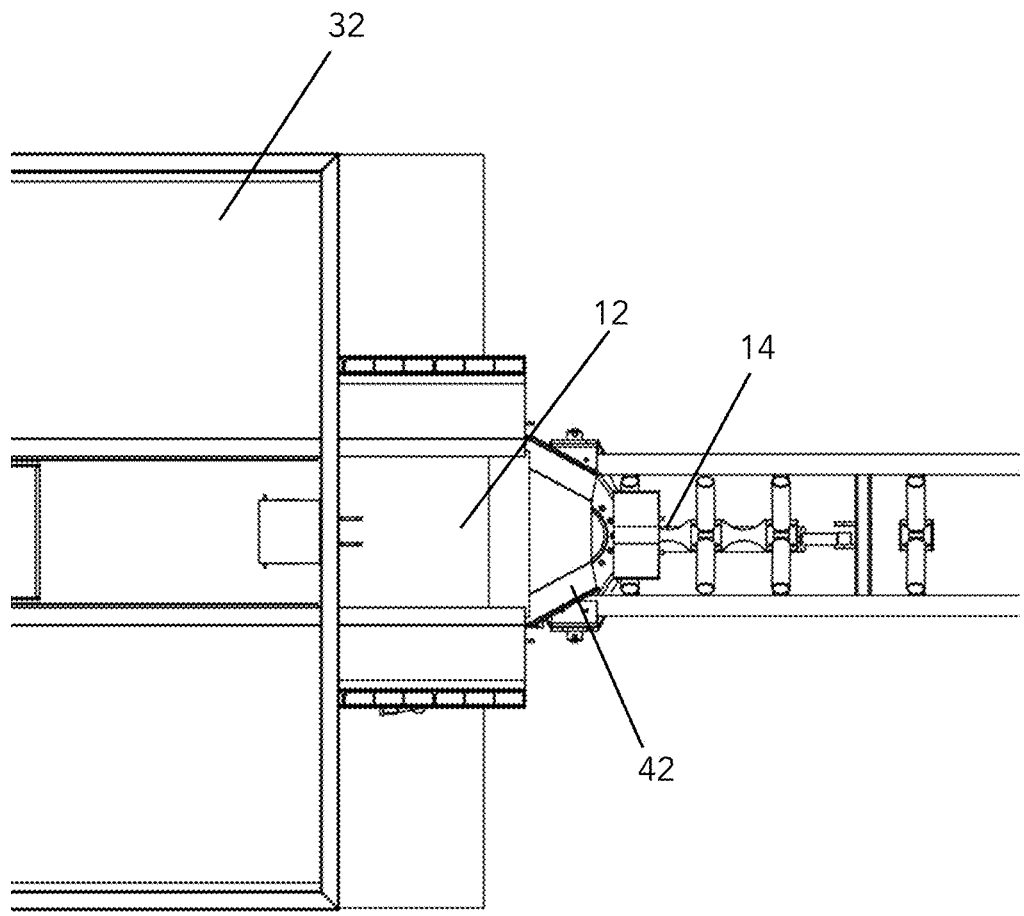
FIG. 9 is a top view of a vehicle with aligned feed and throw conveyors.

FIG. 9 is a top view of a vehicle with feed conveyor 12 aligned above throw conveyor 14. Director chute 42 directs and funnels aggregate or medium from the feed conveyor 12 onto the throw conveyor 14 for precision placement onto the throw conveyor 14. This precision placement of aggregate is intended to centralize the drop point of aggregate onto the pivot point of the turret and turret yoke regardless of the throw conveyors angle with respect to the storage hopper. The pivot arm can position the turret such that this deposit location of the throw conveyor 14 after the director chute 42 is optimized and or consistent regardless of the orientation of the throw conveyor from all right to all left. Aggregate is stored in the hopper 32 for loading onto the feed conveyor 12.

Figure 10A:
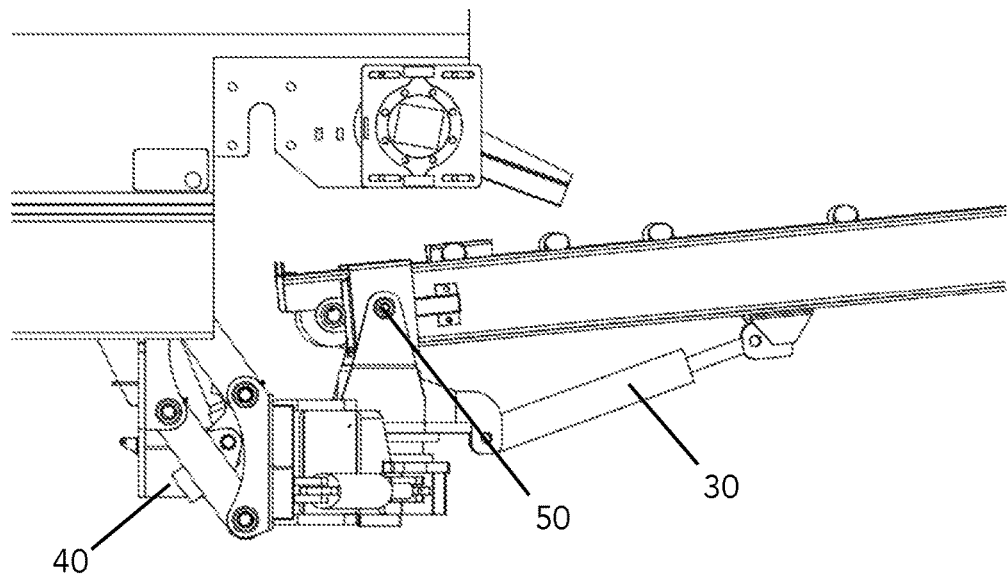
FIG. 10A is a side view of a spreader with parallel lift mount in a lowered position with the throw conveyor at a throwing angle just above grade.
Figure 10B:
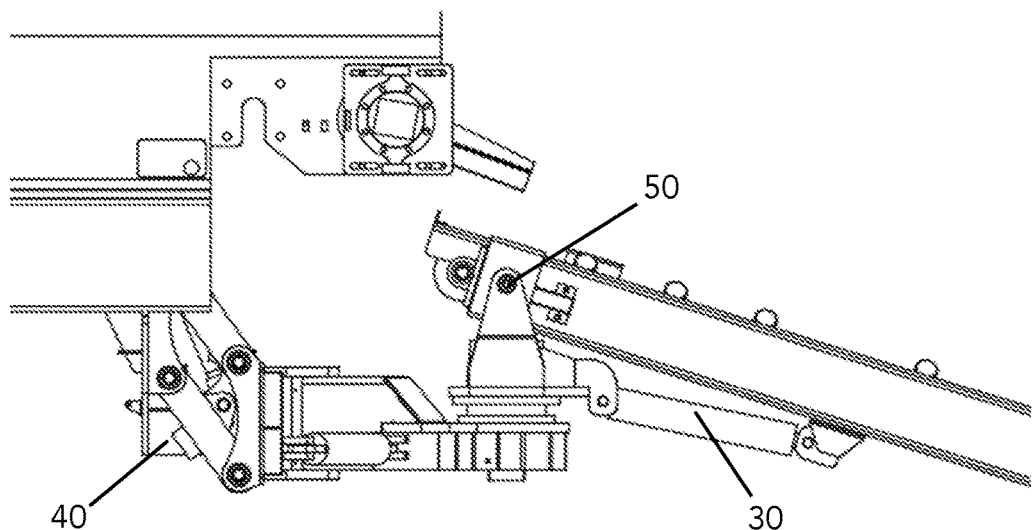
FIG. 10B is a side view of a spreader with parallel lift mount in a lowered position with the throw conveyor at a throwing angle just below grade.

FIG. 10A is a side view of a spreader with parallel lift mount in a lowered position with the pivot arm in the full right position (extended cylinder) with the throw conveyor rotated backwards at a throwing angle just above grade. FIG. 10B is a side view of a spreader with parallel lift mount in a lowered position with the pivot arm in its full left position (retracted cylinder) with the throw conveyor at a throwing angle just below grade. A pivot arm adjustment mechanism, shown here as a hydraulic cylinder, adjusts the pivot arm position through its circular range of motion about the pivot hinge. Other pivot arm adjustment mechanisms would also be functional to perform the same angular adjustment of the pivot arm. Slope adjustment mechanism 30, shown here as a hydraulic cylinder, adjusts the grade or slope angle of the throw conveyor above and below grade. The turret slope hinge 50, interfacing the turret yoke and throw conveyor, supports slope adjustment of the throw conveyor relative to the horizontal, with a range of slope of the throw conveyor adjustable in a broad range of angles. The angle of the throw conveyor can be above grade as shown (or higher than shown) in FIG. 10A to throw aggregate a distance away from the vehicle in a projectile motion or to fill some other vessel or hopper at a slow rate. The throw conveyor can also be angled below grade to fill a ditch or culvert as shown in FIG. 10B. In one example, the throw conveyor can be adjusted from +50° to −25° relative to horizontal.

Figure 11:
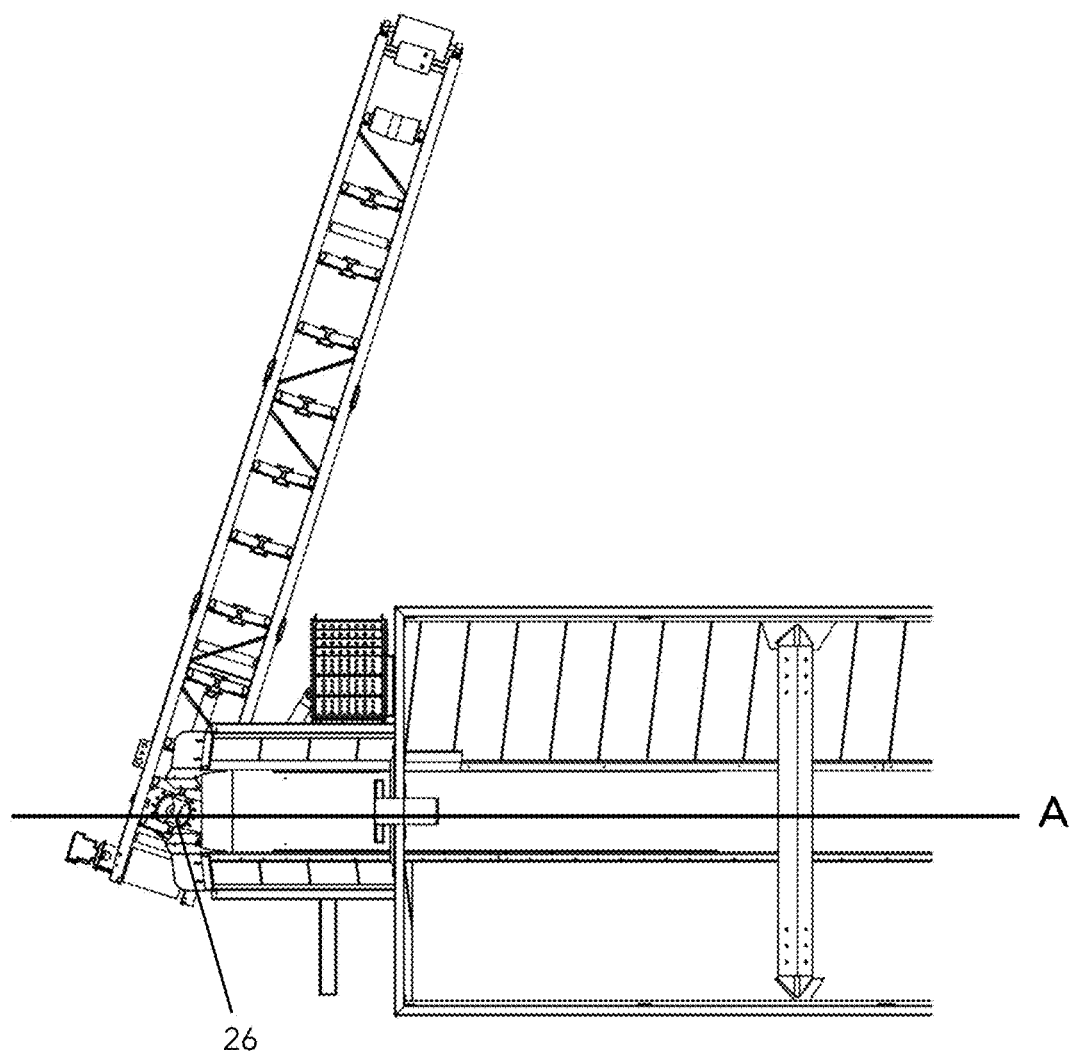
FIG. 11 is a top view of a vehicle with throw conveyor angled right relative to the vehicle and feed conveyor.
Figure 12:
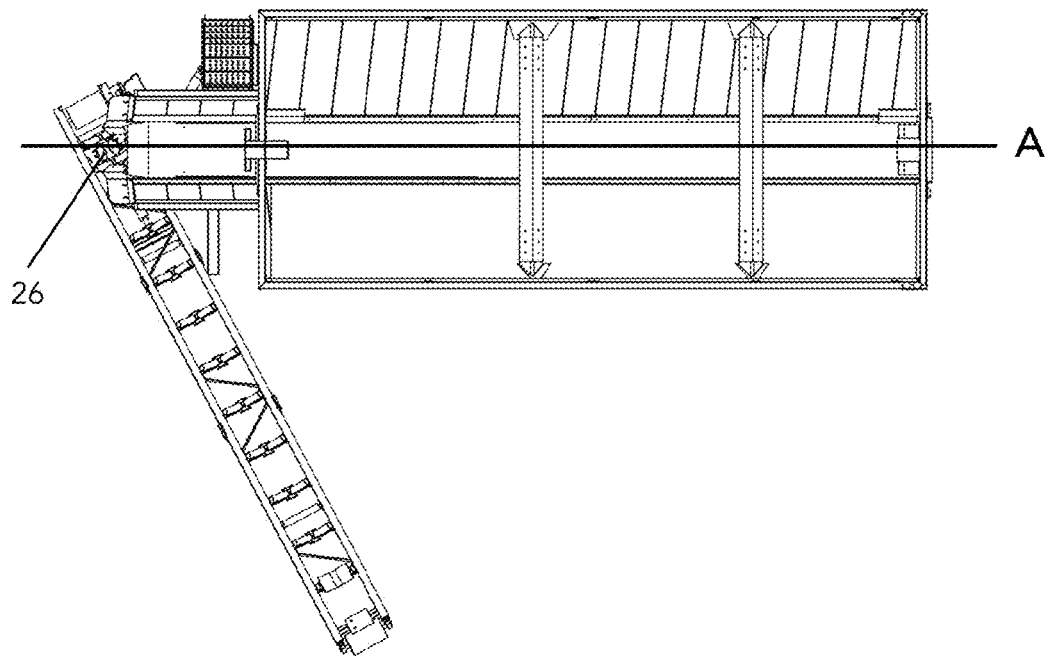
FIG. 12 is a top view of a vehicle with throw conveyor angled left relative to the vehicle and feed conveyor.
Figure 13:
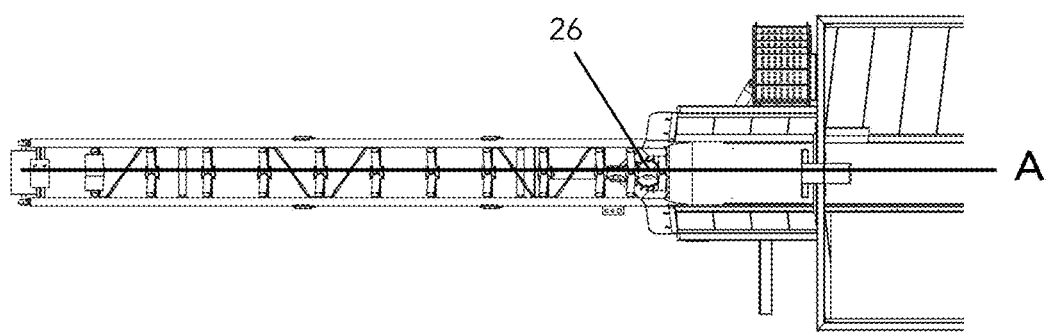
FIG. 13 is a top view of a vehicle with throw conveyor extending straight back relative to the vehicle and feed conveyor.

FIGS. 11-13 show different angular configurations of the throw conveyor relative to the centre line of the vehicle or storage hopper. FIG. 11 is a top view of a vehicle with throw conveyor angled right relative to the centre line A of the vehicle and feed conveyor. Turret 26 supports and controls angular movement of the throw conveyor through the use of a rotational mechanism. FIG. 12 is a top view of a vehicle with throw conveyor angled left relative to the vehicle and feed conveyor shown with centre line A and turret 26. FIG. 13 is a top view of a vehicle with throw conveyor extending straight back relative to the vehicle and feed conveyor. Turret 26 preferably comprises a gear system, and preferably a planetary gear system. Adjustment of the throw conveyor angle can be accomplished manually, or via an electronic control system, optionally remotely. The turret and throw conveyor can be moved simultaneously with or without the throw conveyor moving at any variable speed. The turret gear can be actuated with the lift plate in the up, down or intermediate position.

Figure 14:
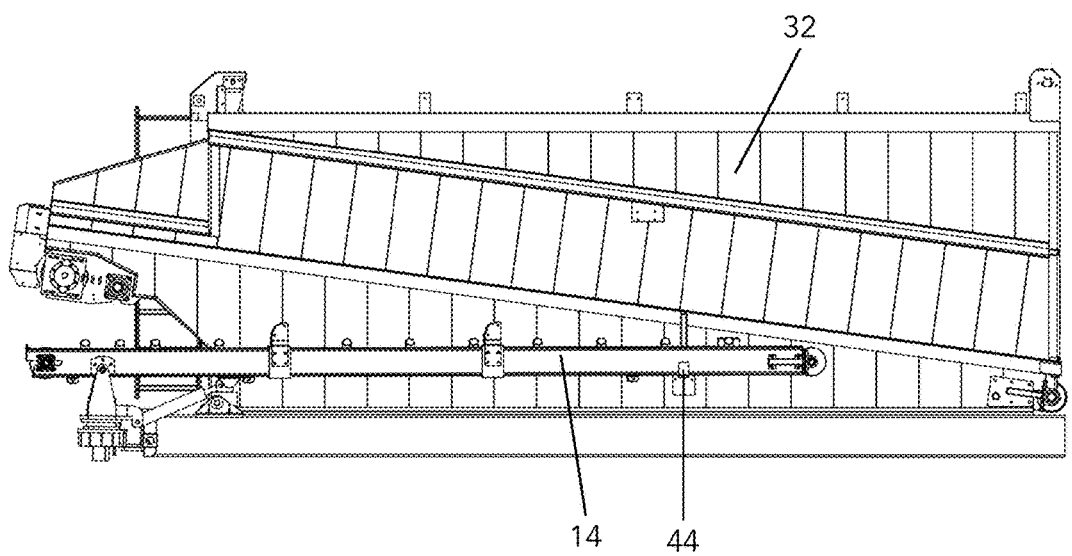
FIG. 14 is a side view of a vehicle with the throw conveyor stowed.
Figure 15:
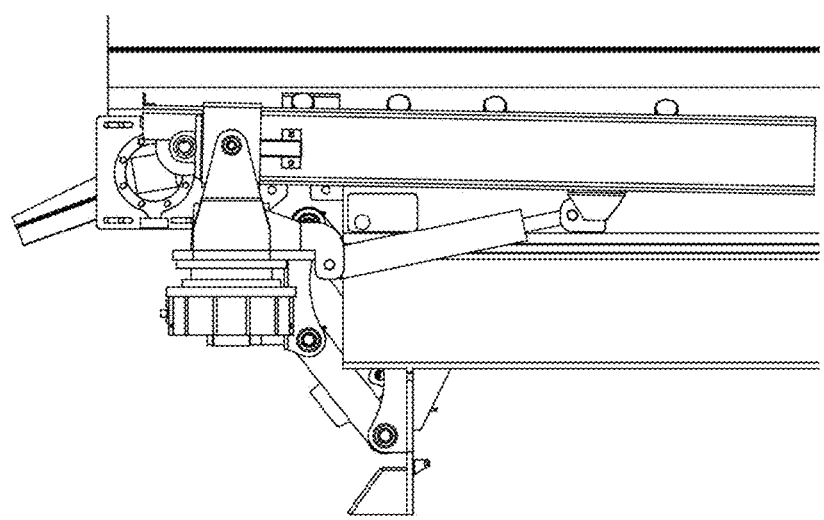
FIG. 15 is a close up side view of a vehicle with parallel lift mount in raised position and throw conveyor stowed.

FIG. 14 is a side view of a vehicle with a hopper 32. One or more stowing bracket 44 can also be used to provide further secure the throw conveyor 14 to the hopper or vehicle during transport. FIG. 15 is a close up side view of a vehicle with parallel lift mount in raised position and throw conveyor stowed. The rotational mechanism for the turret also preferably incorporates a braking mechanism which can be used to secure the throw conveyor 14 in place during storage and while working as required.

Figure 16:
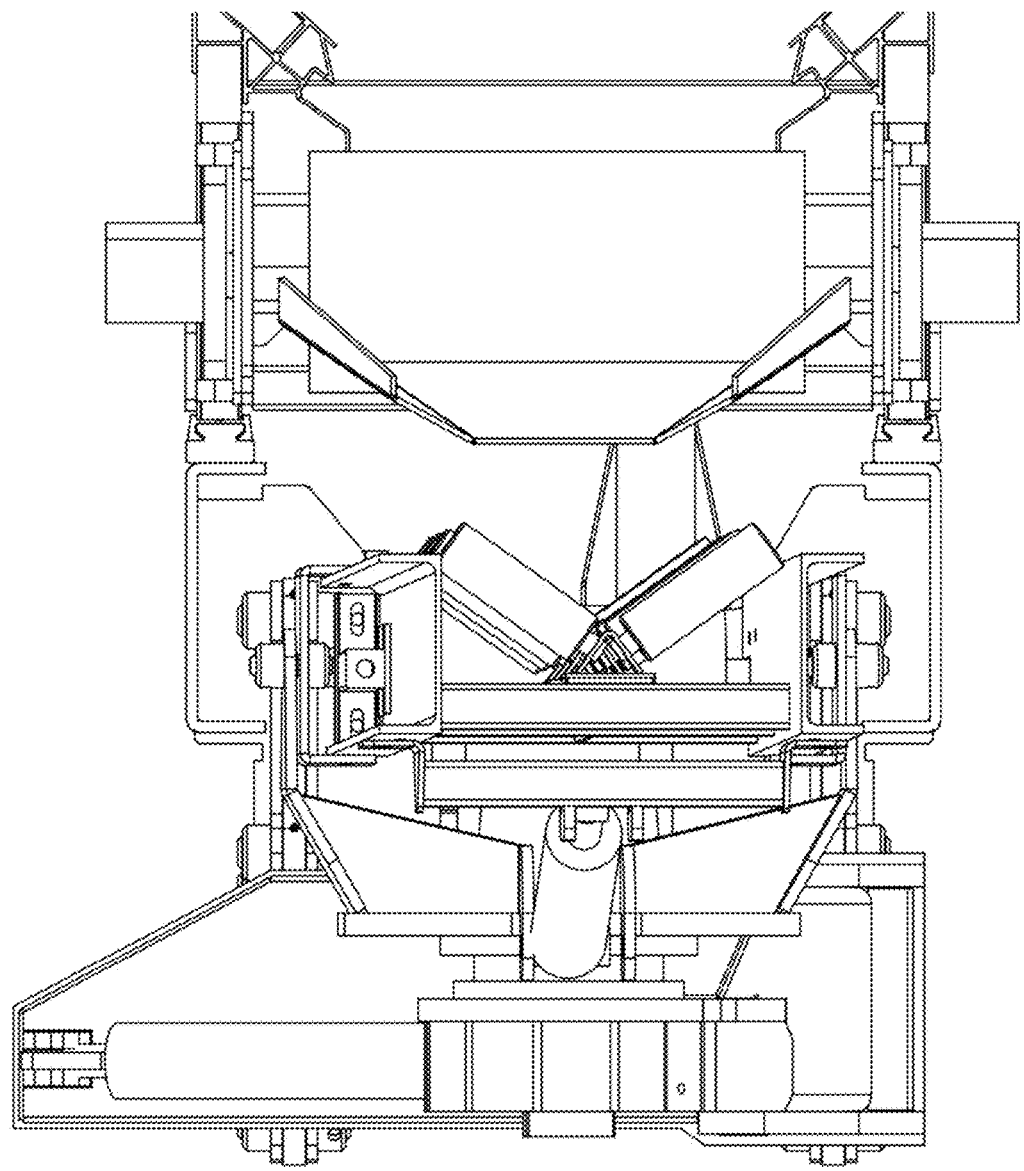
FIG. 16 is a rear cutaway view of a vehicle with parallel lift mount in lowered or throwing position.

FIG. 16 is a rear view of a vehicle with parallel lift mount in lowered or throwing position with the throw conveyor cutaway for clarity. The pivot arm is in the far left position to align the throw conveyor under the feed conveyor. The turret has been rotated to extend the throw conveyor nearly parallel back from the axis of the storage hopper. The vehicle with parallel lift mount can be deployed in areas and environments that are often extreme in temperature and or dusty and dirty, such as icy and salty roads in the winter and dry, dusty desert conditions in the summer. These contaminates can damage or destroy the consistency, accuracy and rigidity of the device over time through abrasion. The vehicle and parallel lift mount should be capable of functioning in a variety of temperatures. For these reasons, the moving components can be physically shielded and or lubricated in such a way to prevent damage associated with long term exposure to the working environment. A functional prototype has been built incorporating a Bay-Lynx Multicat throw conveyor on the back of a modified Multicat storage hopper all mounted to a Mack Truck. A ladder can be stowed up and out of the way of the parallel lift mount to afford greatest rotation to the throw conveyor.

The feed conveyor can be activated on demand either directly or remotely. The speed of the feed conveyor is dynamic and infinitely variable to facilitate different aggregate (media) characteristics. It is also possible to employ the feed conveyor to rapidly offload the aggregate (media) from the storage hopper without moving the throw conveyor from the stowed location. This would effectively simulate the operation of a live bottom and or ejector and or shuttle (walking) floor system. The throw conveyor can be activated on demand either directly or remotely. The speed of the throw conveyor is dynamic and infinitely variable to facilitate different aggregate (media) characteristics. It is possible to employ the throw conveyor to move the aggregate (media) dropped through the director chute from the feed conveyor slower than the feed conveyor, faster than the feed conveyor or the same speed. The feed conveyor and throw conveyor typically function at independent speeds. The feed conveyor is typically larger in width than the throw conveyor. The throw conveyor can be started and stopped independently from the feed conveyor. The speed of the throw conveyor can be readily increased or decreased as desired by the operator. The throw conveyor is typically capable for accelerating the aggregate (media) to projectile motion type speeds far above the standard limitations of a typically engineered trough conveyor.

The storage hopper can also have a load suspension beam or valve mechanism to limit the flow of aggregate from the hopper to the feed conveyor mounted below. The load suspension beam can control flow of aggregate from the storage hopper or prevent flow during transport. Also, transport of the vehicle up a hill can put additional stress on the belt due to aggregate flow, and the load suspension beam can be used as a valve to control how much aggregate is fed to the feed conveyor by raising and lowering the load suspension beam. A hydraulic cylinder on the front and/or back of the load suspension beam can be used to control the height of the beam in the hopper. The load suspension beam can also be moved up and down, optionally at each end independently, to break ice clumps, blockages and material or aggregate bridges which can adversely affect the removal of aggregate (media) from the storage hopper. In one example, if wet aggregate freezes together in the hopper, the load suspension beam can be used to break up the aggregate to control aggregate size for loading onto the feed conveyor. This movement of the load suspension beam up and down can therefore be used to effectively filter the size of aggregates in the storage hopper where large chunks of aggregates or contaminants could be damaging the to the feed conveyor and or throw conveyor or other machinery.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A parallel lift mount for a vehicle comprising a throw conveyor, the parallel lift mount comprising:
   a vertical lift plate;
   a support plate mounted to the vehicle;
   a lift mechanism coupled to the lift plate and the support plate to vertically adjust the lift plate relative to the vehicle, the lift mechanism comprising two support brackets secured to the support plate, two complimentary support brackets secured to the lift plate, and at least two pivot hinges rotationally connected to the support brackets secured to the support plate and the complimentary support brackets secured to the lift plate;
   a pivot arm having a proximal end and a distal end, the proximal end of the pivot arm coupled to the lift plate through a pivot hinge for adjusting angular position of the pivot arm relative to the lift plate;
   a turret mounted to the distal end of the pivot arm to support the throw conveyor; and
   a support boss mounted to the support plate to lock the lift plate against the support plate when the throw conveyor is in a low position,
   wherein the lift plate is configured to vertically adjust the throw conveyor and turret such that the pivot arm is parallel to the ground when the throw conveyor is in the throwing position.

2. The mount of claim 1, wherein the lift mechanism comprises a hydraulic lift.

3. The mount of claim 1, wherein the lift mechanism comprises at least two support brackets for securing the mount to the vehicle, each support bracket coupled to at least two pivot hinges.

4. The mount of claim 1, wherein the turret comprises a rotational mechanism.

5. The mount of claim 4, wherein the rotational mechanism is a planetary gear.

6. The mount of claim 1, further comprising a slope adjustment mechanism for adjusting a slope of the throw conveyor relative to the ground.

7. The mount of claim 6, wherein the slope adjustment mechanism is hydraulic.

8. The mount of claim 1, further comprising a safety hook to secure the lift plate to the vehicle.

9. The mount of claim 1, wherein the proximal end of the pivot arm is mounted off centre of the lift plate.

10. The mount of claim 1, wherein the support boss is selected from a pin, angled plate, wedge, and taper.

11. A spreader vehicle for distributing aggregate, the vehicle comprising:
    a hopper comprising a base, a front with a frontwall, a back with a backwall, and two sidewalls;
    a feed conveyor at the base of the hopper for conveying aggregate from the front of the hopper to the back of the hopper;
    a parallel lift mount, the parallel lift mount comprising:
      a support plate mounted to the vehicle;
      a vertical lift plate;
      a lift mechanism coupled to the lift plate to vertically adjust the lift plate relative to the vehicle such that the lift plate remains substantially parallel to the back of the hopper the lift mechanism comprising two support brackets secured to the support plate, two complimentary support brackets secured to the lift plate, and at least two pivot hinges rotationally connected to each of the support brackets secured to the support plate and the complimentary support brackets secured to the lift plate; and
      a pivot arm having a proximal end and a distal end, the proximal end of the pivot arm coupled to the lift plate through a pivot hinge for guiding rotation of the pivot arm at an angle relative to the lift plate, the distal end of the pivot arm supporting a turret;
    a throw conveyor coupled to the turret;
    a support boss mounted to the support plate to lock the lift plate against the support plate when the throw conveyor is in a low position; and
    a slope adjustment mechanism for adjusting a slope of the throw conveyor relative to the ground.

12. The vehicle of claim 11, wherein the base of the hopper is substantially horizontal.

13. The vehicle of claim 11, wherein the parallel lift adjustment mechanism is hydraulic.

14. The vehicle of claim 11, wherein the lift mechanism comprises at least two support brackets for securing the mount to the vehicle, each support bracket coupled to at least two pivot hinges.

15. The vehicle of claim 11, wherein the turret comprises a planetary gear.

16. The vehicle of claim 15, wherein the planetary gear is powered by a hydraulic motor.

17. The vehicle of claim 11, wherein the proximal end of the pivot arm is mounted off centre of the hopper.

18. The vehicle of claim 11, wherein the slope adjustment mechanism comprises a hydraulic cylinder.

19. The vehicle of claim 11, further comprising a pivot arm adjustment mechanism to adjust the angular position of the pivot arm about the pivot hinge.

20. The vehicle of claim 19, wherein the pivot arm adjustment mechanism comprises a hydraulic cylinder.

21. The vehicle of claim 11, wherein the slope of the throw conveyor can be adjusted from −25° to 50°.

22. The vehicle of claim 11, wherein the angle of the pivot arm can be adjusted from 0° to 180°.

23. The vehicle of claim 11, wherein the turret supports angular movement of the throw conveyor behind the vehicle between the sidewalls of the hopper.

24. The vehicle of claim 11, wherein the lift mechanism is capable of vertically adjusting the lift plate from 1 to 48 inches.

25. The vehicle of claim 11, further comprising a stowing bracket to secure the throw conveyor to the vehicle during transportation.

* * * * *